US007676582B2

(12) United States Patent
Schmieder

(10) Patent No.: US 7,676,582 B2
(45) Date of Patent: Mar. 9, 2010

(54) OPTIMIZED DESKTOP SHARING VIEWER JOIN

(75) Inventor: Robert Wilhelm Schmieder, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 11/428,313

(22) Filed: Jun. 30, 2006

(65) Prior Publication Data

US 2008/0005236 A1 Jan. 3, 2008

(51) Int. Cl.
*G06F 15/16* (2006.01)
*H04L 12/16* (2006.01)
*H04Q 11/00* (2006.01)

(52) U.S. Cl. ...................... 709/227; 370/260
(58) Field of Classification Search ................. 709/204, 709/220–229, 246; 370/270, 465, 477, 351–358; 341/231, 235, 67; 715/751; 345/522, 535, 345/37, 810
See application file for complete search history.

(56) References Cited

U.S. PATENT DOCUMENTS

| | | | | |
|---|---|---|---|---|
| 5,309,564 | A | 5/1994 | Bradley et al. | 395/200 |
| 5,790,127 | A | 8/1998 | Anderson et al. | 345/343 |
| 6,271,839 | B1 | 8/2001 | Mairs et al. | 345/344 |
| 6,570,590 | B1 * | 5/2003 | Dubrow et al. | 715/751 |
| 6,574,674 | B1 | 6/2003 | Mairs et al. | 709/313 |
| 6,691,154 | B1 | 2/2004 | Zhu et al. | 709/204 |
| 7,071,854 | B1 * | 7/2006 | Cardosa et al. | 341/67 |
| 2003/0189601 | A1 * | 10/2003 | Ben-Shachar et al. | 345/810 |
| 2003/0200352 | A1 | 10/2003 | Mohan et al. | 709/318 |
| 2004/0103152 | A1 * | 5/2004 | Ludwig et al. | 709/205 |
| 2004/0179036 | A1 | 9/2004 | Teplov et al. | 345/751 |
| 2004/0181577 | A1 | 9/2004 | Skurikhin et al. | 709/204 |
| 2005/0132299 | A1 | 6/2005 | Jones et al. | 715/759 |

FOREIGN PATENT DOCUMENTS

WO WO 2004/014059 2/2004

OTHER PUBLICATIONS

Brazile, Robert et al, "Software Architecture for the International Collaborative Environment," AACE E-Learn 2002 Conference, Montreal, Canada, Oct. 2002. http://zeus.csci.unt.edu/publications.pdf.
Kircher, Michael et al., Distributed Extreme Programming—eXtreme Programming and Flexible Processes in Software Engineering, Villasimius, Sardinia, Italy, May 21-23, 2001. http://www.dcc.uchile.cl/~cc62v/Recursos/DistributedXP.pdf.

* cited by examiner

*Primary Examiner*—Nathan Flynn
*Assistant Examiner*—Mark O Afolabi
(74) *Attorney, Agent, or Firm*—Workman Nydegger

(57) ABSTRACT

Embodiments herein are designed to counteract the negative effects of an attendee join in a remote session by employing several techniques. One technique maintains and determines maximum decoding capabilities of viewers, which are then used to determine, e.g., a least common denominator of encoding available. As such, a sharer can dynamically modify (either up or down) the encoding of the graphics stream without having to renegotiate decoding capabilities for each viewer upon a join/disjoin. In order to assist in resetting viewer state based on the above encoding technique, other embodiments provide for: context reset for delta and/or other types of order encoding; reset for all sharer and viewer caches; and reset of history for compression context. Another technique provides for delaying the joiner of attendees (and thus the reset of the graphics stream) based on a myriad of static and dynamic policy factors.

20 Claims, 4 Drawing Sheets

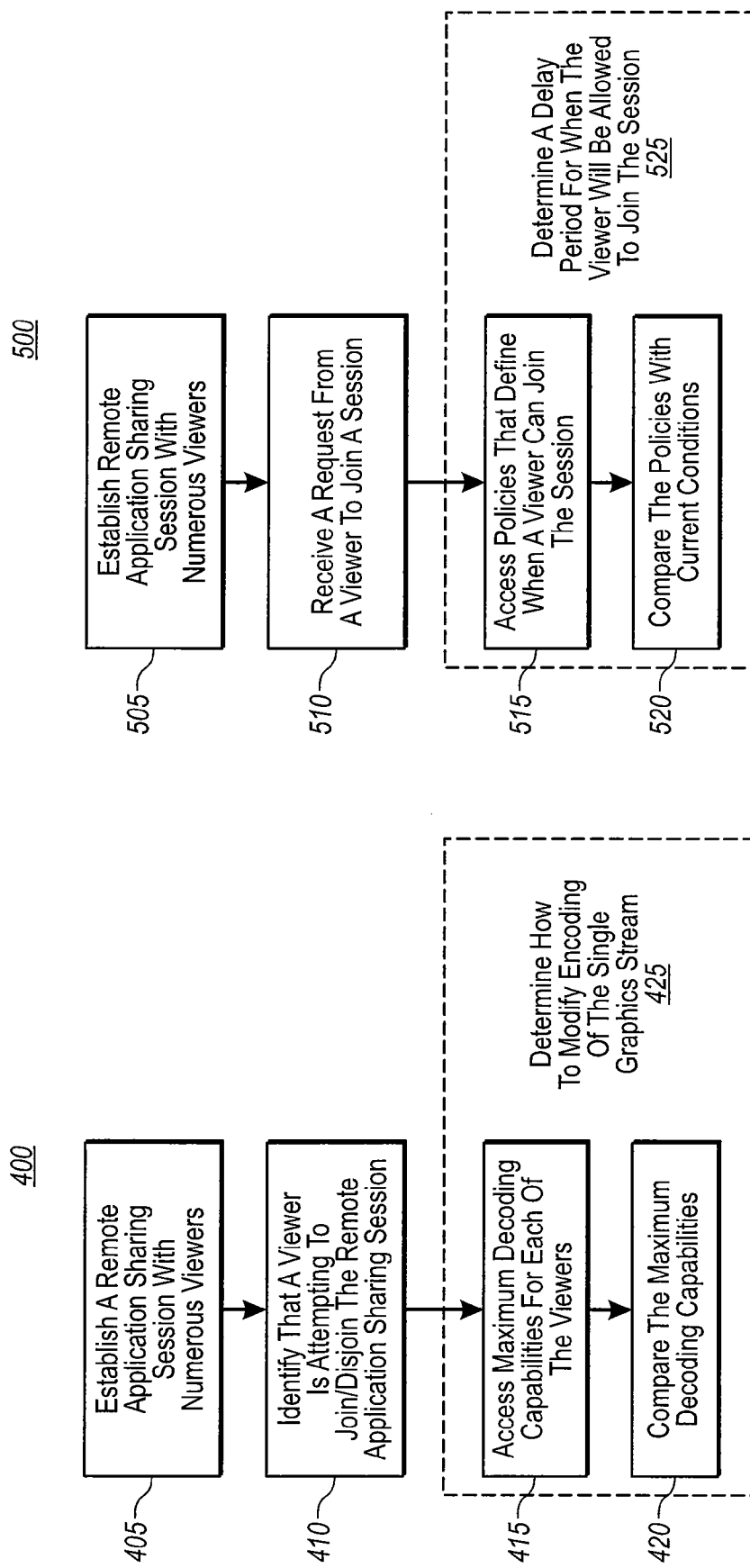

OPTIMIZED DESKTOP SHARING VIEWER JOIN

CROSS-REFERENCE TO RELATED APPLICATIONS

N/A

BACKGROUND

As computerized systems have increased in popularity, so have the needs to distribute files and processing resources of computer systems in networks both large and small. In general, computer systems and related devices communicate information over a network for a variety of reasons, for example, to exchange personal electronic messages, sell merchandise, provide account information, and so on and so forth. One will appreciate, however, that as computer systems and their related applications have become increasingly more sophisticated, the challenges associated with sharing data and resources on a network have also increased.

Some current ways for distributing resources within an organizational network might involve a centralized server or computing system (or local device) sharing resources with one or more clients (or remote devices) that may or may not have such resources installed locally. Such systems normally use a dedicated protocol such as Remote Desktop Protocol ("RDP"), Independent Computing Architecture (ICA), and others, to share various applications with such remote clients. With such protocols, a client computer system can access a centralized network server or computing system, which hosts resources of interest and interact (e.g., sending mouse and keyboard events, etc.) with those resources just as though those resources were installed locally.

The network server in turn processes those interactions, creates corresponding rendering information of the data, and sends both the processed data and created rendering information back to the client. The client computer system then receives the data and rendering information, and uses a client-side video driver to render and display the received data locally. Ideally, this interaction between the client computer system and network system occurs seamlessly as though the client computer had actually processed the data locally with its own installed resources.

Another type of real-time system that is similar in most respects to the centralized sharing model described above involves broadcasting of graphics data for application (e.g., a desktop) screen sharing. This type of feature is also sometimes referred to as a remote assistance program. In this example, the broadcasting computer (e.g., an instructor in a learning environment) and the recipient computer systems (e.g., students) connect using a commonly-installed application program that allows for sharing of desktop views and locally installed applications at the instructor computer. Similar to the centralized computing system scenario, the client computer systems (i.e., the students) might be able to interact with the windows displayed at the instructor's computer as though the windows were the viewer's own computer.

One difference between a single client scenario described above and the screen sharing/remote assistance programs, however, is there are typically multiple users involved in the later. One of the users is typically referred to as a "sharer" that shares the content of his/her computer desktop or other application; the other user's are known as "viewers" that use the remote client to view the content broadcasted by the sharer. In such cases, these multiple users (i.e., the sharer and viewers) typically share the control of the sharer's desktop based on certain restrictions that may be set by the sharer.

The protocols used in the above remote sessions utilize bitmaps for sharing at least portions of application user interfaces, which are sent across a graphics stream for viewing on the remote device. Because bitmaps are expensive in terms of bandwidth consumption when transmitted over a network connection (e.g., the Internet), rather than sending the entire bitmaps most systems nowadays (such as those described above) send graphic primitives and/or other orders, which tell a sub-routine on the client side what and how to draw something. For example, a client may be told to draw a rectangle, line, circle, etc. along with information about where it should be drawn, what size, color, etc. For instance, a rectangle may be used to draw a button for a user interface, a border around a document, or any other purpose for which a rectangular shape may be useful. Of course, there are many other shapes and operations that can be used as primitives, delta, and/or other types of encoding (e.g., compression mechanisms) that may be more sophisticated and require more processing that must be done to transfer and perform the operation on the remote client.

In most application sharing scenarios, protocols require state to be maintained between the sharer and viewers. This is especially true if the sharer is broadcasting a single stream of data to all viewers, which is typically the case since encoding separate streams for each viewer requires tremendous amounts of processing and memory resources on the sharer. Accordingly, in such single stream broadcasts scenarios, when a viewer joins the graphics stream, a stream reset is usually necessary that changes the encoding of the graphics stream. The reason for this is simple. A new viewer that joins the stream will not have its state in sync with the state of the sharer (and/or other viewers in the remote session); and therefore, it will not be able to act on the data sent by the sharer. For example, during a real-time remote session, viewers can randomly join and disjoin from the session. Note that during such time, however, the sharer is continually sending graphics data and commands in the broadcast stream. Viewers that subsequently join after the broadcast of certain primitives described above will not have sufficient information on their system to act on later orders that manipulate such data. Similarly, systems that use compression techniques such as LZ (Lempel-Ziv) based encoders/decoders require synchronization of compression histories, which also need to be synced when viewers are added.

In other words, delta encoding, bitmap caching, LZ compression, and other techniques are used to encode data based on information that was previously sent to the client. Without this information, a client cannot decode the data. As such, a stream reset is needed whenever a new viewer is added to the remote session, which typically means that the server will not encode any new information based on what was previously sent to the viewers. Instead, the server assumes that there is no such previous information when a newly joined client is added.

A stream reset, however, can be expensive in terms of bandwidth that is used, which translates directly into reduced update rate that degrades the user experience by delays in the broadcast graphics stream. This becomes more and more problematic in broadcasts with a large number of viewers and/or where viewers randomly join and leave the broadcast quite frequently. In cases like this, the user experience can degrade to the point where the viewers cannot even receive the graphic stream.

BRIEF SUMMARY

The above-identified deficiencies and drawback of current real-time remote application sharing systems are overcome through example embodiments of the present invention. For example, embodiments described herein provide for minimizing delays in broadcasting of a session due to bandwidth requirements for system resets caused by viewer connectivity by, for example: (1) allowing viewers to randomly join or disjoin a session without requiring renegotiation of viewer decoding capabilities; and/or (2) delaying the connection of new viewers. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for allowing viewers to randomly join or disjoin the session without requiring renegotiation of viewer decoding capabilities. In this embodiment, a remote application sharing session is established with numerous viewers. The sharer broadcasts a single graphics stream of data for the application to the viewers using a protocol that typically requires renegotiation of viewer decoding capabilities whenever a change in the numerous viewers occurs, which typically causes a change in encoding of the broadcast; thus the renegotiation occurs in order to determine if the viewers can support the encoding change. When a viewer is identified as either attempting to join or disjoin the remote application sharing session, maximum decoding capabilities for each of the viewers are accessed. Note that these maximum decoding capabilities are determined when authorizing each of the viewers to join the remote session. The maximum decoding capabilities are then compared for determining how to modify the encoding of the single graphics stream to create a newly encoded single graphics stream that can be sent to, and viewed by, each of the viewers without having to communicate the change to each of the viewers and renegotiate their decoding capabilities as defined by the protocol.

Another example embodiment provides for minimizing delays in broadcasting of the session due to bandwidth requirements for system resets caused by viewer connectivity thru delaying the connection of new viewers. Similar to above, in this embodiment remote application sharing session is established with a numerous viewers. Note that the sharer broadcasts a single graphics stream to the viewers using a protocol that typically requires renegotiation of viewer decoding capabilities whenever a change in encoding of the broadcast occurs in order to determine if the viewers can support the change. Thereafter, a request from a new viewer to join the session is received; where the joining of the session typically results in a change in the encoding of the single graphics stream due to state reset for the viewers. Accordingly, policies are accessed that define when a new viewer can join the session for optimizing the broadcast thereof, which are then compared with current session conditions for determining a delay period for allowing the new viewers to join the session.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates a flow diagram for a method of allowing viewers to randomly join or disjoin a remote session without requiring renegotiation of viewer decoding capabilities in accordance with example embodiments; and FIG. 5 illustrates a flow diagram for a method minimizing delays in broadcasting of a session by delaying the connection of new viewers or attendees in accordance with example embodiments.

DETAILED DESCRIPTION

Figure 1:
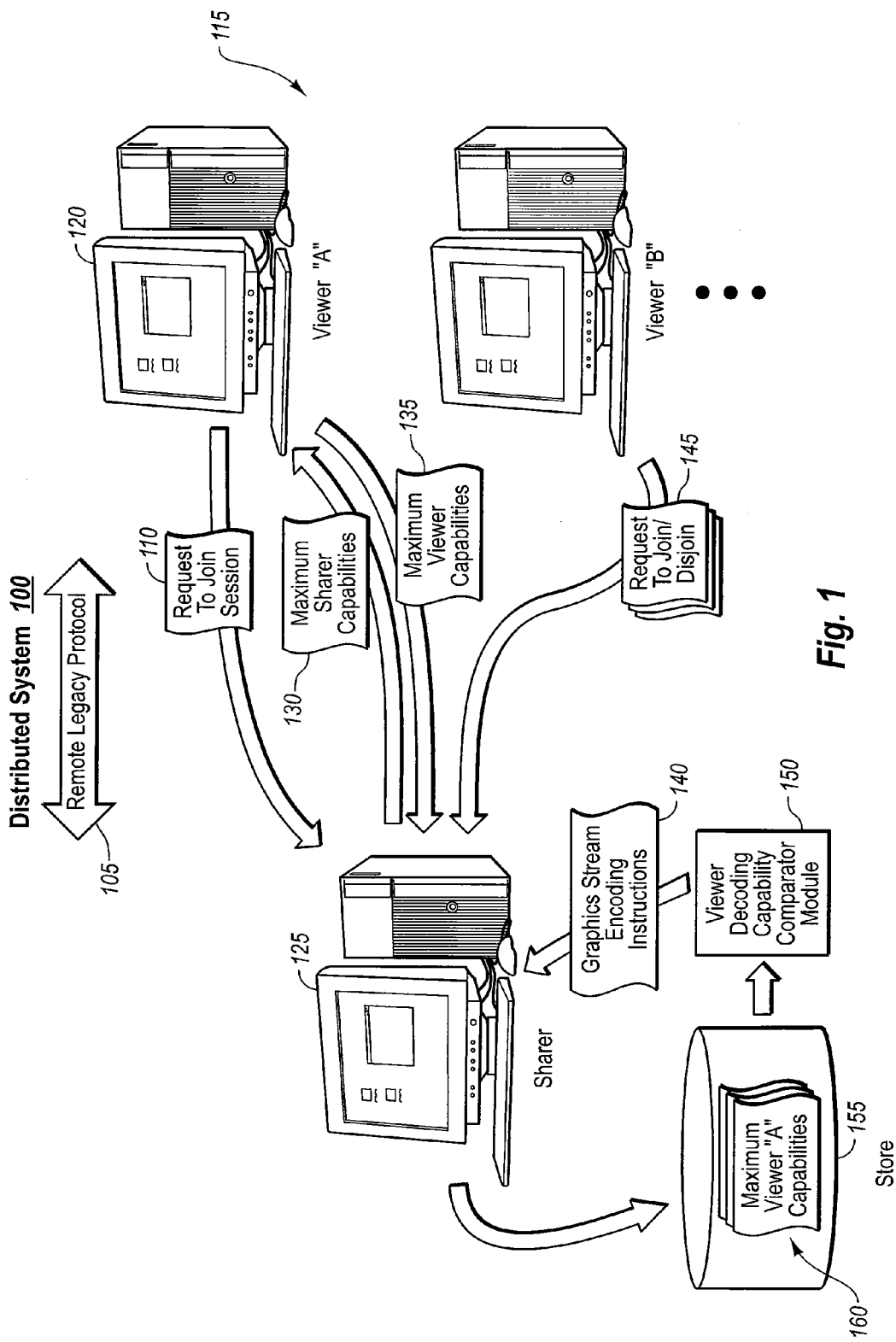
FIG. 1 illustrates a distributed system used to determine maximum viewer capabilities in accordance with example embodiments.

The present invention extends to methods, systems, and computer program products for minimizing the effects caused by viewer connectivity (i.e., session join and disjoin) to a real-time broadcast of a remote application sharing scenario. The embodiments of the present invention may comprise a special purpose or general-purpose computer including various computer hardware or modules, as discussed in greater detail below.

As previously mentioned, graphics stream resets are necessary when an attendee joins or attempts to join a real-time remote session for protocols that broadcast a single graphics stream to multiple users. Note that protocols that send different graphics streams to each viewer may not need embodiments described herein, since the encoding of each graphics stream is typically preconfigured for the particular viewer. As such, no resets are needed when adding or disconnecting each viewer. Nevertheless, as can be seen, such protocols require high amounts of sharer processing power and/or bandwidth. Accordingly, protocols that even broadcast a single stream for only a few viewers can advantageously benefit from embodiments described herein.

For example, in a normal remote desktop protocol (RDP) sharing session the following steps are usually necessary when a new viewer joins the broadcast stream. First, the sharer will send the viewers a "deactivate all" network packet (e.g., as protocol data unit (PDU)). Next the sharer will send a "demand active" PDU, which instructs the viewers to reset their state to the initial settings. In response to demand active PDU, the viewers need to respond with the "confirm active" PDU, which includes data that tells the sharer what stream decoding capabilities does the viewer have. The sharer then waits for these confirm active PDU from all the viewers before the graphic stream can be restarted. This results in a period of time when the viewers cannot see the sharer's desktop or other shared application.

In other words, the sharer will wait for all the confirm actives and after that, based on the decoding capability data received from the viewers, the sharer will determine how the new stream will be encoded. The sharer will reset all its internal state and it will cause a full desktop repaint. It is important to mention that the state reset in the RDP protocol case includes the following steps: context reset for delta and/or other types of order encoding; reset for all sharer and viewer caches; and reset of history for the RDP history based compressor (e.g., a LZ (Lempel-Ziv) based compression context).

Typically, RDP requires the demand/confirm active negotiation sequence above when a new viewer joins. This roundtrip communication happens in sequence with each viewer; thus chances are that the more attendees or viewers (used here interchangeably) there are in the session the longer the reset will take because the sharer will have to wait for all the attendees to rejoin or reconfirm their capabilities. In addition, after the join is completed the full screen has to be sent to all the viewers which, can take some time-again depending on the number of attendees. Accordingly, embodiments are designed to counteract the negative effects of an attendee join by employing several techniques. One technique deals with the delay associated with the "demand active/confirm active" join sequence described above.

More specifically, in this embodiment during an initial authorization of the attendee join (or at some other appropriate time period), embodiments determine the maximum decoding capabilities of the viewer that match the sharer, e.g., by using the above "demand active/confirm active" sequence. These maximum decoding capabilities can then be maintained for all viewers in the session, and subsequently used to determine available encoding techniques and rates as viewers connect and/or disconnect from the session. As such, the sharer can dynamically modify (either up or down) the encoding of the graphics stream without having to renegotiate decoding capabilities for each viewer upon a join/disjoin. More specifically, the sharer can combine or otherwise compare the maximum capabilities that were collected from each viewer and determine an appropriate encoding of the graphics data so that each viewer can decode the graphics stream.

In order to assist in resetting viewer state based on the above encoding technique, other embodiments provide for: context reset for delta and/or other types of order encoding; reset for all sharer and viewer caches; and reset of history for LZ (Lempel-Ziv) and other similar based compression context (e.g., peer to peer/bulk compression). As will be discussed in greater detail below, each mechanism used to reset the graphics stream and/or system is done through techniques applied on the sharer side without requiring modification to the PDU packets or other portions of the protocol. As such, legacy clients or viewers can still reap the optimizing benefits of embodiments described herein, as no change to the remote legacy protocol (e.g., RDP) is necessary.

Another technique provides for limiting or delaying the joiner of attendees (and thus the reset of the graphics stream) based on a myriad of static and dynamic policy factors. Accordingly, the overall experience becomes more predictable and it as allows the sharer to be in control of the experience for the simple reason that an attendee connection will not necessarily translate immediately into a stream reset.

Although more specific reference to advantageous features are described in greater detail below with regards to the FIGS., embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise transmission-type computer-readable media as well as non-transmission type computer-readable media. Non-transmission type computer-readable media can include computer storage media such as RAM, ROM, EEPROM, CD-ROM or other optical disk storage, magnetic disk storage or other magnetic storage devices. Computer readable media can also comprise any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a transmission-type computer-readable medium. Thus, any such connection is properly termed a transmission-type computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Note that although many aspects of embodiments described herein refer to remote application or screen sharing scenarios, embodiments may also be applicable to other real-time broadcasting where state between a sharer and multiple viewers is needed, (e.g., a presentation and/or tutorial sessions). As such, the use of desktop or other applications for sharing is used herein for illustrative purposes only; and therefore, the use of the term "application sharing session" or other similar terminology as used herein should be broadly construed to also encompass these and other types of real-time broadcasting for a single graphics stream scenarios.

As previously mentioned, embodiments are directed towards some of the penalties associated with single graphics stream protocols (e.g., the standard T.128), which require stream resets when a viewer joins and/or disjoins a remote session. For example, as described above RDP requires a demand active/confirm active sequence upon encoding changes of the graphics steam for ensuring that connected viewers can handle the changes. Nevertheless, there are several needed benefits that such sequences accomplish, which embodiments still maintain without changing the underline protocols (e.g., PDU packets of RDP). For instance, it is still necessary to determine the encoding capabilities of connected viewers for modifying the graphics stream, while still supporting legacy clients that only understand the current protocol. In addition, state syncing between the sharer and the viewers must be maintained in a manner that is currently supported by the underline remote session protocol (e.g., RDP).

FIG. 1 illustrates a distributed system 100 configured to elevate some of the penalties described above for the demand active/confirm active or other similar sequences. As shown, a viewer 120 can make a request 110 to join a session. Such session may be any type of session previously described (e.g., screen sharing, tutorial, presentation, etc.). Note that as part of this initial sequence, the sharer 125 and viewer 115 (e.g., viewer "A" 120) go through a series of request-response messaging protocols for authenticating the viewer 115, 120 and allowing connectivity.

For example, typically in the sequence the sharer 125 and viewer 115, 120 negotiate or exchange information regarding the encoding/decoding abilities for graphics data (e.g., encoding rates, memory availability, compression types, supported encoding techniques, etc.). For instance, in the demand active PDU the sharer 125 typically tells the viewer 115, 120 what are the current encoding mechanisms in place for the graphics stream. The viewer 115, 120 will typically try to match these capabilities as best as it can; and will then reply to the sharer 125 with the result in a confirm active PDU. From that point forward it is the responsibility of the sharer 125 to send the viewer 115, 120 only data that the viewer 115, 120 can process (i.e., encoded based on the capabilities advertised as the closest match by the viewer). As such, whenever there is a change to the encoding of the graphics stream (typically due to a viewer joining or leaving the session), this sequence of messages is again performed in a similar renegotiation process.

It should be noted that the above matching effort described above is not necessarily always part of the protocol. For example, the information in a demand active PDU might be used as a hint by the viewer 115, 120 to set up resources. If the sharer 125 tells the viewer 115, 120 a particular cache to use, the viewer 115, 120 will try to allocate that cache in the memory before it replies telling the server that it supports that cache. In other cases, however, the demand active PDU simply tells the viewer 115, 120 what type of PDUs the sharer supports (e.g., input). As such, the above matching sequence is used for illustrative purposes only and is not meant to limit or otherwise narrow embodiments herein unless explicitly claimed.

In embodiments described herein, however, the capabilities of the viewer 115, 120 are actually negotiated only once, e.g., during the initial authentication or some other sequence. Accordingly, when viewer 120 requests 110 to join or otherwise connects for the first time, and typically before allowing the viewer 120 to join the broadcasting stream, the protocol requires the sharer 125 to send a demand active PDU or network packet to the viewer 120. During this negotiation process, however, rather than sending the capabilities for the current encoding stream, sharer 125 sends its maximum capabilities 130 it can support when it tries to negotiate with the viewer 120 (typically for the first time).

Similar to the above confirm active PDU, in response to the maximum sharer's capabilities 130, the viewer 120 will try to match the encoding capabilities of the sharer 125 and respond with its maximum capabilities 135 relative to the match. Once this is done (i.e., once authenticated and connected to the session), the sharer 125 can send the viewer 120 most any data that complies with the initial capabilities as (i.e., the matched maximum viewer capabilities 135) set by the client 120 without extra negotiation. In other words, once the maximum viewer 120 negotiated capabilities are known, those capabilities will be valid until they are negotiated again. In fact, once the sharer 125 knows the maximum capabilities 135 of the viewer 120, it 125 has all the information necessary to make sure the viewer 120 receives only data it can understand.

Note that the sharer 125 can now effectively reduce (or modify in anyway) the encoding capabilities for the graphic stream without notifying the viewers 115, 120. All that the sharer 125 typically needs to do is to take into account the least common denominator for all the viewers 115. Because the sharer does not have to tell the viewers 115 that the stream capabilities were downgraded (or upgraded as the case may be), the sharer 125 does not have to renegotiate with all the viewers 115 new capabilities.

In other words, upon receiving the maximum viewer capabilities 135, sharer 125 can store such capabilities 135 in store 155 with other viewer's maximum capabilities 160 that are active (or passive) participants in the remote session. These capabilities 160 can then be compared using, e.g., viewer decoding capability comparator module 150 for determining, e.g., a least common denominator between such capabilities 160. Based on this comparison, module 150 can generate graphics stream encoding instructions 140 that indicate to the sharer 125 how to appropriately encode the graphics stream such that each viewer 115 or attendees can receive and view the shared application.

It should be noted that although the comparator module 150, store 155, and other components are shown separate from the sharer 125, these items are typically as part of the sharer's 125 system. In fact, it should be noted that there are other components and modules that may not be shown in the figures, but are in fact part of the overall system. For example, comparison module 150 typically runs on sharer 125 and communicates with a graphics encoding component for encoding the graphics stream. In fact, note that any component described herein can be combined with other components, separated into other components or modules, or simply not used based on the embodiments needed. Accordingly, the use of any particular component/module and/or the aesthetic layout thereof as described herein is for illustrative purposes only and is not meant to limit or otherwise narrow the scope of embodiments herein unless explicitly claimed.

Regardless of the modules used or aesthetic layout thereof, note that by choosing the least common denominator, the sharer 125 can be assured that each viewer 115, 120 within the session will be able to receive and decode the changes in the graphics stream. Nevertheless, note that the least common denominator is a preferred embodiment. Accordingly, other mechanisms for choosing the appropriate encoding for the graphics stream based on a comparison of the maximum capabilities 160 are also contemplated herein. For example, the system may decide for policy reasons to choose encoding rates, encoding techniques, allocate memory, or other encoding mechanisms that are below the least common denominator (e.g., based on a percentage near the least common denominator in order to control bandwidth or for other reasons). In addition, the sharer 125 for efficiency reasons may choose not to try to upgrade the encoding capabilities or reset the stream when a viewer leaves. As such, the use of the least common denominator of the maximum viewer capabilities 160 or for a stream reset or change in encoding upon a change in viewers is used herein for illustrative purposes only and is not meant to limit or otherwise narrow as described embodiments unless explicitly claimed.

Also note that "maximum viewer capabilities" 135, 160 typically means closest match to sharer's maximum 130—not necessarily the viewer's 115's, 120's maximum. For example, the viewer 115, 120 may support higher encoding rates, more memory, higher compression, better encoding techniques, etc., than the sharer 125 has available. Accordingly, the use of the term "maximum viewer capabilities" 135, 160 is used for convenience in describing the maximum viewer 115, 120 capabilities relative to the sharer's 125's maximum capabilities, which may or may not be the actual maximum capabilities of the viewer 115, 120. Nevertheless, because as described herein the viewer capabilities 135 may be determined by other mechanism, the term "maximum viewer capabilities" may indeed be the actual maximums.

Nevertheless, it is because of this closest match embodiment that when a request to join/disjoin 145 the session is received-causing changes in the encoding of the graphics stream—the sharer 125 can change the encoding settings in accordance with the maximum viewer capabilities 135 with confidence that the viewers 115, 120 can handle these changes without having any type of renegotiation process. Also note that because the changes have been implemented on the sharer 125 (i.e., the change comes from the demand active PDU set to maximum sharer capabilities 130) rather than within the remote legacy protocol 105 itself, legacy clients 115 are still supported.

In fact, the confirm active/demand active PDUs are exchanged exactly as in the legacy protocols. All that has changed in these embodiments is what the sharer 125 sends the viewer 120 (i.e., maximum sharer capabilities 130) and what the sharer 125 does with the maximum viewer capabilities 135 that are communicated between the two parties (i.e., sharer 125 and viewers 115) of this sequence. In other words, in remote legacy protocols 105, the confirm active/demand active sequence was part of the stream join process. In example embodiments, however, the sequence is used to simply determine the maximum client capabilities 135 and use these to avoid renegotiation sequences.

It should also be noted that although the determination of the maximum viewer capabilities 135 typically occurs upon initial authentication or connection, the maximum capabilities may be determined in other ways. For example, such capabilities 160 may be received in some other sequence or may have been received from a sequence in some previous session. As such, embodiments describing how the maximum viewer capabilities 135 are received are used herein for illustrative purposes only and are not meant to limit or otherwise narrow embodiments unless explicitly claimed.

Typically, when the sharer 125 sends the clients or viewers 115, 120 the deactivate all PDU in the sequence described above, it is the responsibility of the viewers 115, 120 to reset the state for such things as the delta encoding context, bitmap and other caches, compression history context, etc. Accordingly, since embodiments prevent going through the negotiation sequence when a viewer 115, 120 joins/disjoins, other embodiments need to be generated for providing alternates mechanisms for resetting the viewers 115, 120 context. Accordingly, the following description provides several embodiments that can be used to reset decoding components on the viewers without going through the renegotiation process.

Figure 2:
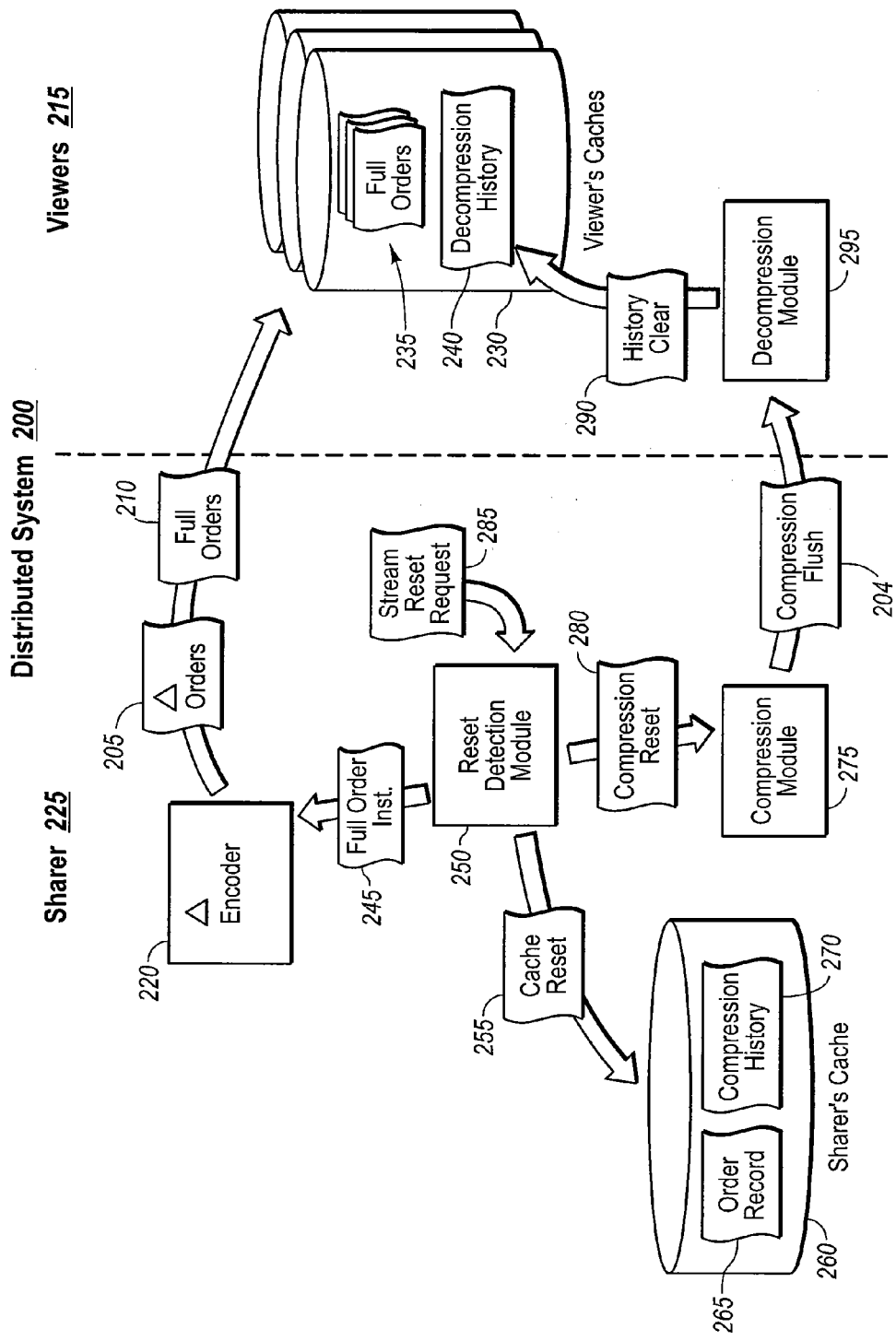
FIG. 2 illustrates a distributed system used to reset state during a viewer or attendee join in accordance with example embodiments.

For example, as shown in FIG. 2, the distributed system 200 includes a sharer 225 and viewers 215 as previously described. Each side 225, 215 supports some type of delta encoding 220, which is used in remote graphic protocols (e.g., RDP) as a type of order encoding previously described. More specifically, the sharer 225 typically keeps an order record 265 for each order type allowed in the protocol. For example, the record 265 typically includes the last order for each type that was sent to the viewers 215. When a new order of the same type is sent to the viewers 215, it can be encoded as a delta 205 of the previously sent order. New viewers 215 connecting to the broadcast, however, will not have the state of the last order 205. Accordingly, when the next delta 205 is sent, the new viewer 215 will not be able to decode the order 205.

Accordingly, embodiments provide a mechanism for syncing order context by switching the sharer's 225's delta encoder 220 to a mode that causes sending of full orders 210 (not deltas) for each order type. More specifically, when reset detection module 250 receives a stream reset request 285 (e.g., in response to a viewer 215 joining), instructions 245 are sent to the delta encoder 220, telling it 220 to send full orders 210 to all viewers 215. More specifically, when a reset happens, the delta encoder 220 will remember that before it can send a delta order 205 of a particular type, it now has to send a full order 210 of that same type. Any subsequent orders after the full orders 210 can be sent as deltas 205. This will cause the context for each order type and for all the viewers 215 to get in sync with the sharer 225 context. In other words, the sharer 225 now treats all of the viewers 215 as if they had simultaneously just connected to the session. Note that the reset detection is usually based on a reset command (shown here as Stream reset request 285), which is usually issued immediately after an attendee 215 joins. As will be described in greater detail below; however, the reset command may also be issued in a delayed fashion depending on join policies and other considerations that determine an optimum time to schedule a reset.

Similar to the above embodiment, the sharer 225 does not necessarily have to tell the viewers 215 to reset their caches 230. Instead, embodiments support putting the sharer 225 in a state where it 225 considers all the viewer's caches 230 as empty when a stream rest request 285 is received (e.g., when a viewer 215 joins the broadcast). This will ensure that the sharer 225 does not tell any newly connected viewer 215 to use a cached resource when the new viewer 215 does not have that resource available. Accordingly, when the stream reset request 285 is received by reset module 250, the cache rest 255 can be used to purge the bitmaps in the sharer's cache 260, putting the sharer 225 back to an initial state for beginning to send data to the viewers 215.

Also note that when a viewer 215 joins the stream, its history buffer for the compression context (i.e., decompression history 240) is empty. Thus, the sharer 225 will have to treat the new viewer 215 as such. Nevertheless, since the compression context has to be in sync for all the viewers 215, the sharer 225 needs to tell the other viewers 215 to reset their compression context. Accordingly, embodiments provide that typically in a next broadcast of a compressed packet to viewers 215, a compression flush 205 flag on the compressed packet is sent to all viewers 215. In response, the viewers 215 will detect this flag 205 and reset their state before attempting to decompress the current or subsequent packets. More specifically, when a stream reset request 285 is detected as described above by reset module 250, a compression reset 280 notice is sent to compression module 275. As such, sharer 225 resets its compression history 270 in sharer's cache 260 and typically sends a compression flush 204 attached in the next packet sent to decompression modules 295 for each viewer 215. In response, a clear history 290 causes the decompression history 240 to be emptied on the viewers' side 215, e.g., by setting the counter of how many bytes are in the decompression history 240 to zero.

Again it should be noted that the aesthetic layout of FIG. 2 shows various components as separate and potentially unrelated; however, such configuration is used for convenience in describing the functionality of embodiments herein. For example, the encoding of the graphics stream typically occurs in a hierarchical fashion similar to a stack. As such, orders 210 may be delta encoded 205; others may require some resources (e.g., bitmaps) to be sent on the viewer 215 side and cached 230 before the orders 210, 205 can use those resources. Typically, at the end of the encoding process, everything is sent through a bulk compressor (e.g., compression module 275). Nevertheless, note that in some systems the various types of encoding may not be available. For instance, some systems may be configured to do compression 275 without any type of delta encoding 220; others may support delta encoding 220 without compression 275. As such, the aesthetic layout of the system components, the particular components used or not used in the encoding, and the types of encoding available, are used herein for illustrative purposes only and are not meant to limit or otherwise narrow the scope of embodiments unless explicitly claimed.

Note that in each of the above embodiments used to reset or sync state between the sharer 225 and the viewers 215, the changes have occurred to the code on the sharer 225 and not to the remote legacy protocol (e.g., RDP). In other words, the legacy protocol 105 remains unchanged, and the sharer 125, 225 side code uses the protocol in a different manner. As such, embodiments still support the use of legacy clients 215 through the standard remote protocols (e.g., RDP). Also, it should be noted that although embodiments described herein typically refer to commands, functions, and other objects that are specific to RDP, other similar protocols can take advantage of these and other advantageous features described herein. Accordingly, the use of RDP in embodiments is for illustrative purposes only and is not meant to limit or otherwise narrow the scope of the claims herein.

Also note that eliminating the renegotiation stage when a viewer 215 connects solves most of the problems related to broadcasting data to a large number of viewers 215. There is, however, still a penalty when a new attendee or viewer 215 joins. For example, as noted above, the contexts for the viewers 215 still need to be flushed 204 and it takes bandwidth for the contexts to be synced again to the point they are efficient. For instance, if we would continuously flush the bitmap caches 260 the bandwidth consumption will increase because the server 225 will have to send the bitmaps to the viewers 215 at all times instead of sending them once. The same applies for the compression context or histories 270, 240. In addition, each time a viewer 215 is joined, the full screen typically needs to be sent to each viewer 215, again using up limited bandwidth resources. Thus, resetting the context or graphics stream too often will completely negate the effects of encoding, compression, and other bandwidth saving mechanism.

In order to overcome some of the negative effects caused by frequent attendee 215 join/disjoin, other embodiments provide for a delayed attendee mechanism that prolongs the connection of viewers 215 based on varying policies set by the sharer 225. Note that this delayed attendee 215 join embodiment does not necessarily remove the effects of a join, but rather puts the sharer 225 in control for determining optimal times for allowing joins to occur. The sharer can apply the following mechanisms to determine when a join can occur, of course (as described in greater detail below) note that any combination of these techniques is also possible.

Figure 3:
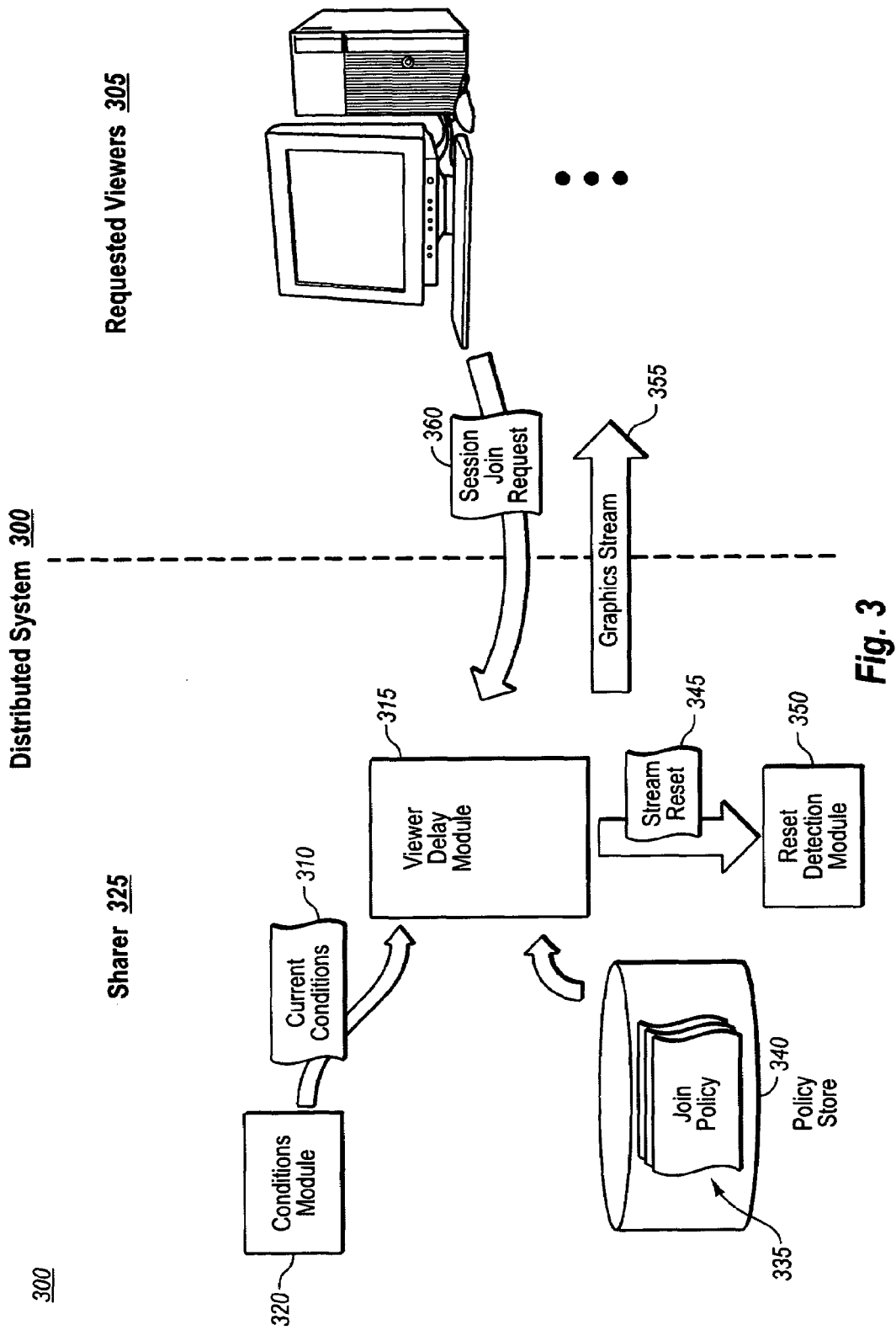
FIG. 3 illustrates a distributed system that uses a viewer or attendee delay module in accordance with example embodiments.

FIG. 3 illustrates example embodiments within a distributed system 300 designed to delay resetting of the graphics stream 355 and/or attendee 305 session connection based on join policies compared to current conditions 310 within the system 300. As shown, a sharer 325 is provided with a viewer delay module 315. As a session join request 360 is received from the requested viewers 305, the viewer delay module 315 accesses join policies 335 from policy store 340. As will be described in greater detail below, these join policies 335 may take on many forms and be based on a myriad of factors. For example, the policies 335 may be based on a fixed value (e.g., a time interval, number of requested viewers, etc.), or may be more dynamic in nature. Regardless, however, of the type of policies 335 defined, viewer delay module 315 compares the policies with current conditions 310 from condition module 320, which monitors conditions within the distributed system 300 as described below. Similar to the join policies 335, these current conditions 310 can take on many forms and be based on many factors as a direct correspondence to the policies 335.

When the current conditions 310 satisfy one or more of the join policies 335, a stream reset 345 is sent to the reset detection module 350 as previously described, and the graphics stream 355 is also reset and sent to the requested viewers 305. Once the graphics stream 355 is sent to the requested viewers 305, the viewers 305 are joined to the session. It should be noted, however, that the delay attendee 305 mechanism does not necessarily depend on the above stream reset embodiment. Nevertheless, they address the same problem associated with delays in graphics steam broadcast caused by attendee join/disjoin; and therefore, together become a powerful tool used in combating this problem.

As mentioned above, the join policies 335 (as well as the current conditions 310) can be based on numerous factors and take on a myriad of types. For example, the policies 335 may be a fixed form based on such things as time, number of attendees, etc. More specifically, the sharer 325 may decide that a reset caused by a join can occur only at certain time intervals. This can be a setting that a user can explicitly communicate to the sharer 325 code through some API, a default setting specified by a developer, or both. Accordingly, when a new viewer 305 attempts to connect to the broadcast session, it will not immediately join the stream. Instead a stream reset 345 will be scheduled to occur at a later time (based on the monitoring of the current conditions 310, i.e., how much time has lapsed). If there is pending reset already scheduled, the extra schedule may not be necessary. Accordingly, in this embodiment during the time a reset is pending multiple viewers 305 can connect to the stream and they will join the stream all at the time the reset 345 occurs. This makes it so a reset 345 can join multiple attendees.

Of course, there may be other types of static delay or join policies 335 based on other time intervals. For example, the time interval may be reset each time a new viewer 305 requests to join 360. Of course, such policy 335 would further delay the joining of previous requested viewers 305; and therefore, may not be preferable. Nevertheless, as one will recognize, there are many different types of policies that can be generated and used, and even combinations of policies 335 can be created as described herein. As such, any specific use of a particular join policy 335 or current condition 310 as used herein is for illustrative purposes only and is not meant to limit or otherwise narrow embodiments herein unless explicitly claimed.

Other types of static policies 335 may include a number of requested viewers 305 waiting to join a session. For example, a join policy 335 may specify that only upon receiving "X" number of join requests 360 should a stream reset 345 occur. Alternatively, the policy may be based on the number of viewers already connect. For example, if only a few viewers are connected, then a sharer 325 may set a policy to immediately allow others to join, whereas after a predetermined amount of current viewers, requested viewers 305 may be delayed.

Note that the number policies described above may not allow some requested viewers 305 to join. For example, based on a strict policy of only "X" viewers may join at a time, if some number of joiners less than "X" is left a problem exists for any leftover requested viewers. Accordingly, other embodiments allow for combining such policies 335 with some other policy 335 for ensuring that all viewers are able to join. For example, the number of join policy 335 may be combined with the time interval policy 335 described above, such that a join occurs for whichever current conditions 310 are satisfied first (i.e., either the time has elapsed or the number of requested viewers 305 has been satisfied). As such, all viewers 305 would be assured to be allowed to join.

Of course, there may be other join policies 335 that are static in nature. For example, the policy 335 may be passed on a type of joiner. For example, certain types of attendees may be able to join the session or otherwise cause a stream reset 345 earlier than others. For example, different groups of people may be classified as necessary for the session; and therefore, be immediately allowed to join; other attendees may be classified as observers and may need to wait based on other defined policies 335 as described herein. Of course, there may be a myriad of degrees of groups and users (e.g., facilitator, participant, observer, etc.), and there may even be such things as an allow/deny lists, or any other similar mechanism for distinguishing users. In fact, a sharer 325 (or other facilitated viewer 305) may be given a dialog box when a user first requests to join 360 a session, which identifies the user and requests to confirm, deny, or delay the attendee's ability to join the session. Based on the selection from the user, the sharer 325 can then take the appropriate action.

Of course, not all policies 335 (and therefore current conditions 310) are static in nature. For example, there may be an automatic join policy 335, which allows the sharer 325 code to dynamically determine if a join should occur or not. For example, viewer delay module 325 can take into account the current amount of graphics data that has to be sent to viewers 305 and the current update rate for the viewers 305. If the pending data reaches an amount that is close to the amount of data sent in a reset 345, the viewer delay module 325 can decide to force a reset 345—since there is little or no real penalty associated with it. Note, however, that typically this embodiment extends or should be applied in conjunction with those above, because in case there is sufficient bandwidth available the amount of pending data typically will not be close to the one used in a reset 345.

Also note that the policies 335 can be applied based on a hierarchical ordering or some other conditioning. For example, the join policies 335 may be ordered "policy 1" through "policy 5", wherein the current conditions 310 of each policy 335 are tried in order until one of the policies is met. Of course, there may be any type of ordering, pairing, or other relationships for grouping or otherwise executing policies 335 as can be recognized. As such, the above simple hierarchical relationship is used herein for illustrative purposes only.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagrams for FIGS. 4 and 5—is used to indicate the desired specific use of such terms.

As previously mentioned, FIGS. 4 and 5 illustrate flow diagrams for various exemplary embodiments of the present invention. The following description of FIGS. 4 and 5 will occasionally refer to corresponding elements from FIGS. 1-3. Although reference may be made to a specific element from these Figures, such references are used for illustrative purposes only and are not meant to limit or otherwise narrow the scope of the described embodiments unless explicitly claimed.

FIG. 4 illustrates a flow diagram for a method 400 of minimizing delays in session broadcast by allowing viewers to randomly join or disjoin the session without requiring renegotiation of viewer decoding capabilities. Method 400 includes an act of establishing 405 a remote application sharing session with numerous viewers. For example, as shown in FIG. 1, sharer 125 in distributed system 100 can establish a remote application sharing session with viewers 115. Note that typically, sharer 125 broadcasts a single graphics stream of data for the application to viewers 115 using a protocol that typically requires renegotiation of viewer 115 decoding capabilities whenever a change in encoding of the broadcast occurs in order to determine if the viewers 115 can support the change. For example, the protocol may be RDP based on T.120/T.128, which typically require a demand/confirm active join sequence for sending to a viewer current information regarding encoding mechanisms used in the broadcast and for determining the capabilities of the viewer 115.

Method 400 also includes an act of identifying 410 that a viewer is either attempting to join or disjoin the remote application sharing session. For example, sharer 125 may receive from a viewer 120 a request to join session 110, which typically results in a change in the encoding of the single graphics stream or common sharer. Because such join typically results in a stream reset, method 400 includes a step for determining 425 how to modify encoding of the single graphics stream.

More specifically, step 425 includes an act of accessing maximum decoding capabilities for each of the viewers 415. For example, sharer 125 can access store 155 for determining the maximum viewer capabilities 160 for the viewers 115, 120. Typically, the maximum viewer decoding capabilities 160 are determined when authorizing each of the viewers 115, 120 to join the remote session; however, the maximum viewer decoding capabilities 160 can be determined in other ways as previously described. Nevertheless, in one embodiment, the protocol is remote desktop protocol based on T.120, which requires a demand/confirm active join sequence for sending to a viewer current information regarding encoding mechanisms used in the broadcast and for determining the capabilities of the viewer 115, 120. Instead of sending the current information regarding the encoding mechanisms used, the sharer sends its maximum encoding capabilities 130 such that the viewer 115, 120 will respond with its maximum decoding capabilities 135 relative to the sharer's maximum capabilities 130, which the sharer 125 can save and use when making encoding changes. Note that the maximum decoding capabilities may include: encoding types supported; memory size available; video processing speed, etc.

Step for 425 then includes an act of comparing 420 the maximum decoding capabilities. For example, viewer decoding capability comparator module 150 may compare the maximum viewer capabilities 160 for determining how to modify encoding of the single graphics stream to create a newly encoded single stream that can be sent to, and viewed by, each of the viewers 115, 120 without having to communicate the change to each of the viewers 115, 120 and renegotiate their decoding capabilities as defined by the protocol. In one embodiment, such comparison of the maximum decoding capabilities determines the least common denominator between each of the maximum decoding capabilities 160.

Also note that other embodiments support state reset for the viewers 115, 120, without having to modify data packet instructions (e.g., PDUs) used by the protocol for control purposes in order to support legacy clients 115. In such embodiment, the state reset may occur by one or more of the following: resetting the delta encoder 220 on the sharer 225 such that one or more full orders 210 are sent before one or more deltas 205 can be sent to the viewers 215; resetting the sharer's 225's state to consider that bitmap caches 230 for the viewers 215 are empty, without having to send cache reset communications to the viewers 215; and/or setting a compression flush flag on a compression packet 204 broadcast to the viewers 215, which resets a history buffer 240 for compression context on each of the viewers 215 in order to sync the compression context thereof. Note that in one embodiment, the flush flag is typically sent to the viewers 215 on the next compression packet.

FIG. 5 illustrates a flow diagram for a method 500 of delaying the connection of new viewers. Method 500 includes an act of establishing 505 a remote application sharing session with a numerous viewers. For example, as shown in FIG. 1, sharer 125 in distributed system 100 can establish a remote application sharing session with viewers 115. Note that typically, sharer 125 broadcasts a single graphics stream of data for the application to viewers 115 using a protocol that typically requires renegotiation of viewer 115 decoding capabilities whenever a change in encoding of the broadcast occurs in order to determine if the viewers 115 can support the change. For example, the protocol may be RDP based on T.120/T.128, which requires a demand/confirm active join sequence for sending to a viewer current information regarding encoding mechanisms used in the broadcast and for determining the capabilities of the viewer.

Method 500 also includes an act of receiving a request from new viewers to join the session. For example, as shown in FIG. 3, sharer 325 may receive a session join request 360 from requested viewers 305; however, joining of the session will typically result in a change in the encoding of the single graphics stream due to state reset for the viewers 115. Method 500 then includes a step for determining 525 a delay period for allowing the new viewers to join the session. More specifically, step for 525 includes an act of accessing 515 policies that define when a new viewer can join the session for optimizing the broadcast thereof. Step for 525 then includes an act of comparing 520 the policies with current session conditions. For example, viewer delay module 325 can access join policies 335 from policy store 340. These policies 335 are then compared with current conditions 310 as previously defined for determining when a requested viewer 305 can join a session.

Note that the policies 335 (and thus the current conditions 310) may be based on a myriad of factors and may be either static or dynamic in nature. For example, policies 335 may be based on a predetermined time interval for allowing the requested viewers 305 to join such that after the predetermined time interval, the requested viewers 305 are joined. More specifically, the policies may be based on the time duration from a last reset such that the requested viewers 305 will be allowed to join after a predetermined time interval from the last reset. Such predetermined time intervals may also be dynamically adjusted based on interleaving policies and current state conditions.

Another embodiment defines the policies 335 based on certain users that may join at certain time intervals. For example, the users may be defined in groups that can join at the certain time intervals, such that one group of users can join earlier than other groups. In another embodiment, the policies 335 are compared to a current amount of graphics data sent to the viewers 115 with a current update rate for the viewers 115 for determining a delay period for the requested viewers 305. Note that any of the described delay periods may be zero (or close thereto) such that the requested viewers are allowed to join the session almost immediately. In yet another embodiment, the policies 335 may be based on the number of viewers waiting to join the session (i.e., requested viewers 305), the number of viewers 115 currently connected to the session, or both. Still other embodiments provide that the policies 335 may be ordered in a hierarchical fashion as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a distributed computing system used for a remote application sharing session in which a single sharer's computing system is used to broadcast a single graphics stream of data for an application to be viewed at a plurality of viewer computing systems using a protocol that requires renegotiation of each viewer computing system's decoding capabilities when a change occurs with respect to particular viewer computing systems joined to the session by addition of a new viewer computing system joining the session, or by an existing viewer computing system of the plurality of viewer computing systems disjoining the session, a method of minimizing delays in session broadcast that would otherwise be caused by such renegotiation with each viewer computing system by allowing the new viewer computing system to join or the existing viewer computing system to disjoin the session while in progress without requiring renegotiation of each viewer computing systems' decoding capabilities, the method comprising:

establishing the remote application sharing session with the plurality of viewer computing systems, wherein the single sharer's computing system is used to broadcast the single graphics stream of data for the application to the plurality of viewer computing systems using the protocol that requires renegotiation of each viewer computing system's decoding capabilities whenever a new viewer computing system requests to join the session due to potential changes in encoding of the broadcast resulting from the new viewer computing system's joinder of the session;

at the time of authorizing each viewer computing system that is participating in the remote application sharing session, determining at the single sharer's computing system the maximum decoding capability for each of the plurality of participating viewer computing systems and storing the maximum capability in a data store;

the single sharer computing system using the stored viewer computing system maximum decoding capabilities to derive a least common denominator decoding capability;

identifying at the single sharer computing system that either the new viewer computing system is attempting to join the remote application sharing session or that an existing viewer computing system is disjoining from the remote application sharing session, either of which will result in a change in the encoding of the single graphics stream, and in the case of the new viewer computing system determining the new viewer system's maximum decoding capability and storing it in the data store to permit updating of the least common denominator decoding capability; and the single sharer computing system thereafter modifying the encoding capability of the single graphics data stream to broadcast the single graphics stream using the newly updated least common denominator decoding capability, thus permitting all participating viewer systems to receive the single graphics data stream without having to interrupt the session to individually renegotiate each viewer system's capability as defined by the protocol.

2. The method of claim 1, wherein the protocol is a remote desktop protocol based on T.120, which requires a demand/confirm active join sequence for sending to a viewer computing system current information regarding encoding mechanisms used in the broadcast and for determining the capabilities of the viewer computing system, wherein the method further includes, instead of sending current information regarding the encoding mechanisms used, the single sharer's computing system sending the maximum encoding capabilities from the data store and the single sharer's computing system receiving from the viewer computing system a response with the viewer computing systems's maximum decoding capabilities relative to the single sharer's computing system's maximum encoding capabilities, which the single sharer's computing system saves for use when making encoding changes.

3. The method of claim 1, wherein the encoding capabilities of the single graphics data stream include one or more of: encoding types supported; memory size available; or video processing speed.

4. The method of claim 1, wherein state of the plurality of viewer computing systems is reset, without having to modify data packet instructions used by the protocol for control purposes in order to support legacy clients, and wherein the state reset occurs by one or more of the following: resetting the delta encoder on the single sharer's computing system such that one or more full orders are sent before one or more deltas can be sent to the plurality of viewer computing systems; resetting the single sharer's computing system state to consider that bitmap caches for the plurality of viewer computing systems are empty, without having to send cache reset communications to the plurality of viewer computing systems; or setting a compression flush flag on a compression packet broadcast to the plurality of viewer computing systems, which resets a history buffer for compression context on each of the plurality of viewer computing systems in order to sync the compression context thereof.

5. The method of claim 4, wherein the state reset occurs by setting the compression flush flag on a compression packet broadcast to the plurality of viewer computing systems, and the method further comprises performing compression using an LZ based mechanism that supports the flush flag.

6. The method of claim 4, wherein the state reset occurs by setting the compression flush flag on a compression packet broadcast to the plurality of viewer computing systems, and the method further comprises sending the flush flag on a next compressed packet after the stream reset.

7. The method of claim 1, wherein the application broadcast is one or more of a desktop, a tutorial lesson, or a meeting application.

8. A computer program comprising one or more non-transmission-type computer storage media having stored thereon computer executable instructions that, when executed by a processor, can cause the distributed computing system to perform the method of claim 1.

9. The method of claim 1 further comprising:
accessing one or more policies that define when the new viewer computing system can join the session for optimizing the broadcast thereof; and
comparing the one or more policies with current session conditions for determining a delay period for allowing the new viewer computing system to join the session.

10. The method of claim 9, wherein the policies are based on a predetermined time interval for allowing the new viewer computing systems to join such that after the predetermined tune interval, the new viewer computing system is joined.

11. The method of claim 9, wherein the policies define that certain new viewer computing systems may join at certain time intervals.

12. The method of claim 11, wherein the new viewer computing systems are defined in groups that can join at the certain time intervals, such that one group of new viewer computing systems can join earlier than other groups of new viewer computing systems.

13. The method of claim 9, wherein the policies compare a current amount of graphics data sent to a plurality of viewer computing systems with a current update rate for the plurality of viewer computing systems for determining a delay period for the new viewer computing systems.

14. The method of claim 9, wherein the delay period determined immediately allows the new viewer computing system to join the session.

15. The method of claim 9, wherein the policies are based on a number of new viewer computing systems waiting to join the session, a number of existing viewer computing systems currently connected to the session, or both.

16. The method of claim 9, wherein the policies are based on a time duration from a last reset such that the new viewer computing system will be allowed to join after a predetermined time interval from the last reset.

17. The method of claim 9, further comprising dynamically adjusting the predetermined time interval based on interleaving policies and current state conditions.

18. The method of claim 9, wherein the policies are ordered in a hierarchical fashion.

19. A computer program product for use in a distributed computing system used for a remote application sharing session in which a single sharer's computing system is used to broadcast a single graphics stream of data for an application to be viewed at a plurality of viewer computing systems using a protocol that requires renegotiation of each viewer computing system's decoding capabilities when a change occurs to which particular viewer computing systems are joined to the session, either by a new viewer computing system joining the session, or an existing viewer computing system disjoining the session; and for use to perform a method of minimizing delays in session broadcast that would otherwise by caused by such renegotiation with each viewer computing system by allowing the new viewer computing system to join, or the existing viewer computing system to disjoin, the session while in progress without requiring renegotiation of each viewer computing systems' decoding capabilities, the computer program product comprising one or more non-transmission type computer storage media having stored thereon computer executable instructions that when executed by one or more processors cause the distributed computing system to:

establish a remote application sharing session with the plurality of viewer computing systems, wherein the single sharer's computing system is used to broadcast a single graphics stream of data for an application to the plurality of viewer computing systems using the protocol that requires renegotiation of each viewer computing system's decoding capabilities whenever a new viewer computing system requests to join the session due to potential changes in encoding of the broadcast resulting from the new viewer computing system's joinder of the session;

identify at the single sharer's computing system that either the new viewer computing system is attempting to join the remote application sharing session, which will result in a change in the encoding of the single graphics stream;

access one or more policies that define when the new viewer computing system can join the session for optimizing the broadcast thereof; and compare the one or more policies with current session conditions for determining a delay period for allowing the new viewer computing system to join the session, thus permitting each existing viewer computing system of the plurality of viewer computing systems to receive the single graphics data stream without having to interrupt the session to individually renegotiate each existing viewer computing system's capability as defined by the protocol.

20. In a distributed computing system used for a remote application sharing session in which a single sharer's computing system is used to broadcast a single graphics stream of data for an application to be viewed at a plurality of viewer computing systems using a protocol that requires renegotiation of each viewer computing system's decoding capabilities whenever a change to which viewer computing systems are joined to the session, including when a new viewer computing systems joins the session and whenever an existing viewer computing systems of the plurality of viewer computing systems disjoin the session, a method of minimizing delays in session broadcast that would otherwise by caused by such renegotiation with each viewer computing system by allowing the new viewer computing system to join or the existing viewer computing system to disjoin the session while in progress without requiring renegotiation of each existing viewer computing systems' decoding capabilities, the method comprising:

establishing the remote application sharing session with the plurality of viewer computing systems, wherein the single sharer's computing system is used to broadcast a single graphics stream of data for an application to the plurality of viewer computing systems using the protocol that requires renegotiation of each viewer computing system's decoding capabilities whenever a new viewer computing system requests to join the session due to potential changes in encoding of the broadcast resulting from the new viewer computing system's joinder of the session;

at the time of authorizing each viewer computing system that is participating in the remote application sharing session, determining at the single sharer's computing system the maximum decoding capability for each of the plurality of participating viewer computing systems and storing the maximum capability in a data store;

the sharer computing system using the stored viewer computing system maximum decoding capabilities to derive a least common denominator decoding capability;

identifying at the sharer computing system that either the new viewer computing system is attempting to join the remote application sharing session or that an existing viewer computing system is disjoining from the remote application sharing session, either of which will result in a change in the encoding of the single graphics stream, and in the case of the new viewer computing system determining the new viewer system's maximum decoding capability and storing it in the data store and updating the least common denominator decoding capability based on the new viewer system's maximum decoding capability;

accessing one or mare policies that define when the new viewer computing system can join the session, so as to permit optimizing the broadcast thereof, the one or more policies hierarchically define:

certain time intervals at which certain new viewer computing systems may join the session;

a delay period for joining the session based on a current amount of graphics data relative to a current update rate;

a number of new viewer computing systems waiting to join the session, a number of existing viewer computing systems currently connected to the session, or both; and a time duration from a last reset, and a predetermined time interval set from the last reset;

comparing the one or more policies with current session conditions and determining a delay period before which the new viewer computing system is allowed to join the session;

the sharer computing system thereafter modifying the encoding capability of the single graphics data stream to broadcast it using the newly updated least common denominator decoding capability, thus permitting all existing viewer systems to receive the single graphics data stream without having to interrupt the session to individually renegotiate each existing viewer system's capability as defined by the protocol; and joining the new viewer computing system to the session after the delay period.

* * * * *